United States Patent [19]

Somers

[11] Patent Number: 4,534,573
[45] Date of Patent: Aug. 13, 1985

[54] CHUCK KEY

[75] Inventor: Robert I. Somers, Raleigh, N.C.

[73] Assignee: Black & Decker, Inc., Newark, Del.

[21] Appl. No.: 506,997

[22] Filed: Jun. 23, 1983

[51] Int. Cl.³ .............................................. B23B 45/00
[52] U.S. Cl. ................. 279/1 K; 16/110 R; 81/16; 408/241 R
[58] Field of Search ................. 408/241 R; 279/1 K, 279/1 Q; 81/90 A, 90 R; 8/21; 16/110 R, DIG. 18, DIG. 19, DIG. 24; 7/167

[56] References Cited

U.S. PATENT DOCUMENTS

| 2,529,567 | 11/1950 | Neck | 24/73 |
| 2,824,651 | 2/1958 | Davis | 408/241 R X |
| 2,941,426 | 6/1960 | Muller et al. | 408/241 R |
| 3,141,359 | 7/1964 | Bennett et al. | |
| 4,093,396 | 6/1978 | Widigs | 408/241 R |
| 4,186,933 | 2/1980 | Derbyshire | 279/1 K |
| 4,274,772 | 6/1981 | Widigs | 408/241 R |

FOREIGN PATENT DOCUMENTS 2827852  1/1980  Fed. Rep. of Germany ... 408/241 R

Primary Examiner—Z. R. Bilinsky
Attorney, Agent, or Firm—Finnegan, Henderson, Farabow, Garrett & Dunner

[57] ABSTRACT

A chuck key having a chuck engaging portion attached to an elongated member that is used to apply torque to the chuck engaging portion. The elongated member has a groove along its length disposed to receive and clamp onto an electrical cord placed therein.

14 Claims, 6 Drawing Figures

CHUCK KEY

FIELD OF THE INVENTION

The present invention relates to a chuck key used to adjust the opening in the jaws of a chuck which is normally associated with a power driven drill.

BACKGROUND OF THE INVENTION

In order to accommodate the various tools or drill bits that may be placed within the jaws of a chuck in a power driven drill, means are provided for adjusting the opening defined by the jaws. The chuck is ordinarily adjusted by means of a chuck key which normally has a shaft with an associated circular bevel gear. The shaft of the key is engaged in a hole in the side of the chuck and the key rotated with the bevel gear on the key engaged to a gear of the chuck. Rotation of the key opens or closes the jaws of the chuck and thereby facilitates changing the tool clamped in the jaws.

Various means have been used to retain the chuck key in association with the tool with which it is used. Such means include recesses in the body of the tool into which the chuck key is inserted, clamps on the electrical cord of the electric drill which engage the chuck key in some fashion or strap-like members that tie the chuck key to a portion of the tool, usually the cord.

Prior art methods of associating the chuck key with the tool have several shortcoming. Inserting the chuck key into portions of the tool itself requires the tool to be designed with a specific location that is convenient to the user in which the chuck key may be inserted and retained. Clamps associated with the cord or the tool itself must provide a simple means of engaging the chuck key to the clamp while being able to withstand the wear and tear associated with the use of the tool. Such clamps must be capable of grasping the chuck key formly so it is not lost yet releases it readily to the operator of the tool. Straps which affix the chuck key to the tool or the cord have the shortcoming of allowing the chuck key to move about during the operation of the tool in a manner that may either be distracting to the operator or inadvertently engage the workpiece in a manner that could hinder use of the tool.

The present invention is intended to provide an inexpensive chuck key that may be retained on the electrical cord of an electric drill in a manner that eliminates many of the shortcomings of the prior art. The primary object of the present invention is to retain the chuck key on the cord in a manner such that it is readily detachable, yet it retains the chuck key at the desired location without complex tooling associated with the production of a special key retaining device and without the associated shortcomings of a dangling chuck key.

Other advantages of the invention will be apparent from the accompanying drawings, may be learned from the detailed description of the preferred embodiment or may be learned by practice of the invention disclosed herein.

SUMMARY OF THE INVENTION

The chuck key of the present invention includes a means for engaging a chuck. Preferably the chuck engaging means is a conventional shaft and tapered bevel gear disposed to engage the conventiona chuck of a power driven drill. The chuck key of the present invention further includes an elongated member rigidly affixed to the chuck engaging means. The elongated member has, along its length, a groove that is disposed to receive an electrical cord therein. The member further includes means for gripping the cord when the cord is placed within the groove. Preferably, the gripping means comprise opposite pairs of projections through which the cord is forced into the groove. Preferably, the chuck engaging means is affixed to the elongated member on the side opposite the groove. It is also preferred that the chuck key of the present invention be generally L or T-shaped. It is further preferred that the elongated member be constructed of a rigid material such as a glass fiber reinforced plastic.

DETAILED DESCRIPTION OF THE PREFERRED EMBODIMENT

In accordance with the invention, the chuck key includes a means for engaging a chuck. As here embodied and most clearly depicted in FIGS. 1, 3, 4 and 5, the chuck engaging means of the chuck key 10 preferably comprises a shaft 12 and a concentric tapered circular bevel gear 14. The size of the shaft and the gear depend on the size of the complementary hole in the chuck (not shown) and the gear on the chuck into which the gear 14 is to be engaged.

Figure 1:
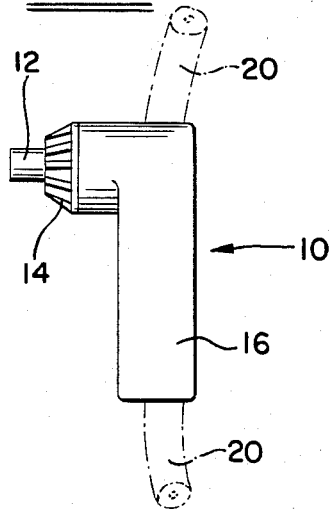
FIG. 1 is a side view of one embodiment of the present invention, showing the chuck engaging means and its association with the elongated member.

In accordance with the invention, the chuck key further includes an elongated member having along its length a groove disposed to receive an electrical cord therein. As here embodied and most clearly depicted in FIGS. 1 and 2, the elongated body 16 includes a groove 18 along its length. As is apparent from FIG. 1, the groove 18 is disposed in size to receive a cord 20 along its length. The chuck engaging means is rigidly affixed to the elongated member, such that the rotational force used to open and close the chuck of the associated tool is generated by rotating the chuck key about the shaft 12 by applying pressure to the ends of the elongated member 16. As depicted in FIG. 1, the chuck key is generally L-shaped. However, the configuration of the handle or elongated member 16 with respect to the chuck engaging means may have a number of shapes. It may be T-shaped (as in FIG. 4), a combination of an L and T shape as in FIG. 5 for example. Other configurations are also possible.

As here embodied the chuck engaging means is a metal member mounted in the elongated body 16. The preferred embodiment utilizes a metal chuck engaging member that is insert-molded into an elongated member formed of glass fiber reinforced nylon.

In accordance with the invention, the chuck key further includes means for gripping the cord when the cord is placed within the groove. As here embodied and most clearly depicted in FIGS. 2 and 3, the chuck key includes two pairs of projections, 22 and 24, and 26 and 26 respectively. The pairs of projections respectively, define openings 30 and 32. The openings are smaller in cross-section than the cord that is placed within the groove 18.

Figure 2:
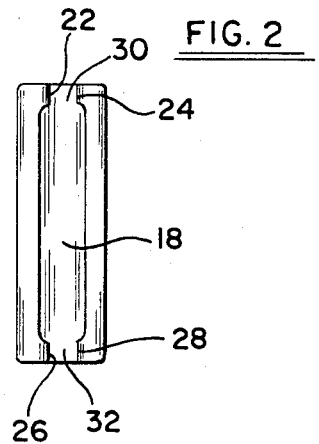
FIG. 2 is a rear view of the embodiment of FIG. 1 showing the cord-receiving groove and the projections used to grip the cord when it is placed within the groove.
Figure 3:
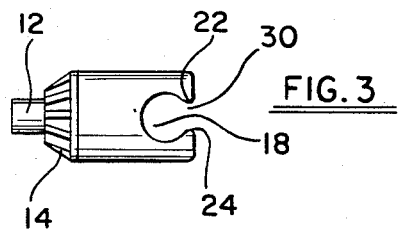
FIG. 3 is a top view of the embodiment of FIGS. 1 and 2 showing the configuration of the groove, the upper pair of projections and the relationship of the chuck engaging means to the groove.
Figure 4:
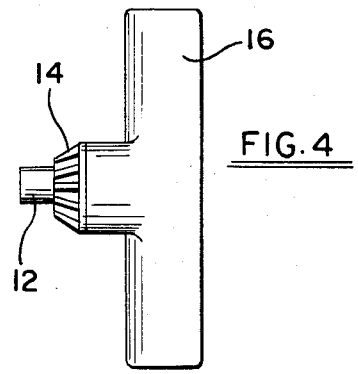
FIG. 4 is a side view of another embodiment of the invention having a T-shaped configuration.
Figure 5:
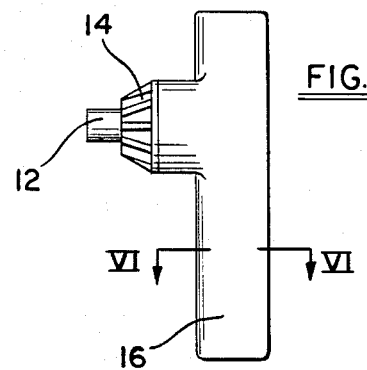
FIG. 5 is a side view of a third embodiment of the invention having a configuration that is a combination of an L-shape and a T shape.
Figure 6:
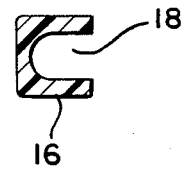
FIG. 6 is a cross-sectional view of the embodiment of FIG. 5 along line VI—VI.

As shown in FIG. 2, it is preferred that the pairs of projections be placed at each lengthwise extremity of the groove 18. The chuck key 10 is retained on the cord 20 in such a manner that it is not readily removed from the cord by simply flexing the cord. The openings defined by the pairs of projections, i.e., the opening 30 for the pair of projections 22 and 24, and the opening 32 for the projections 26 and 28, in combination with the elastic properties of the cord determine the amount of force necessary to place the chuck key on the cord. A highly resilient elastomeric covering on the cord would allow the openings 30 and 32 to be relatively narrow. With a more rigid elastomeric material, the openings would need to be larger, such that it does not require an unreasonable force to place the chuck key on the cord or remove it. One skilled in the art can readily determine the relationship between the dimensions of these openings and elastic properties of the cord.

In the preferred embodiments of the invention, the elongated member is formed of glass-reinforced plastic eg. nylon with the chuck engaging means being separately formed of metal and rigidly affixed thereto. The elongated member should have sufficient strength that the force necessary to secure the chuck by application of pressure to the elongated member does not permanently deform it such that it no longer may be effectively used as a chuck key or be retained on the cord.

The present invention has been described in general and by reference to preferred embodiments. The scope of the invention is, however, to be determined by the appended claims taken in light of the above-description.

What is claimed is:

1. A device for operating a mechanism releasably receiving interchangeable working implements in operative position in an electrically-powered tool, said device comprising:
    an integrally-formed one-piece handle having an elongated portion and a post portion, said post portion projecting from one side of said elongated portion perpendicular to the axis thereof, said elongated portion having an axial groove in the other side thereof for receiving the electrical cord of said tool and including means for gripping said cord within said groove; and
    means integral with the projecting end of said post portion for engaging and adjusting said mechanism.

2. The device of said claim 1 wherein said gripping means are paired projections adjacent said groove, each pair of said paired projections defining an opening smaller in cross-section than the cross-section of said cord.

3. The device of claim 2 wherein said handle includes a pair of projections at each lengthwise extremity of said groove.

4. The device of claim 1 wherein said handle is generally L-shaped.

5. The device of claim 1 wherein said handle is generally T-shaped.

6. The device of claim 1 wherein said handle is comprised of a fiber reinforced plastic material.

7. The device of claim 1 wherein said engaging means is metal.

8. The device of claim 1 wherein said handle is comprised of a fiber reinforced plastic material, said engaging means is metal, and said engaging means is insert molded in said handle.

9. A chuck key comprising:
    an integrally-formed, one-piece handle having an elongated portion and a post portion, said post portion projecting from one side of said elongated portion perpendicular to the axis thereof, said elongated portion having an axial groove in the other side thereof for receiving the electrical cord of said tool and including means for gripping said cord within said groove; and
    means integral with the projecting end of said post portion for engaging a chuck to adjust the jaws thereof.

10. The chuck key of claim 9 wherein said gripping means comprises two axially spaced pairs of opposed projections defining a pair of openings through which said cord must be elastically deformed to place said cord within said groove.

11. The chuck key of claim 9 wherein said handle is generally L-shaped.

12. The chuck key of claim 9 wherein said handle is generally T-shaped.

13. The chuck key of claim 9 wherein said handle comprises glass-filled nylon.

14. The chuck key of claim 9 wherein said handle comprises glass-filled nylon, said engaging means is metal, and said engaging means is insert molded in said handle.

* * * * *